Patented Mar. 8, 1932

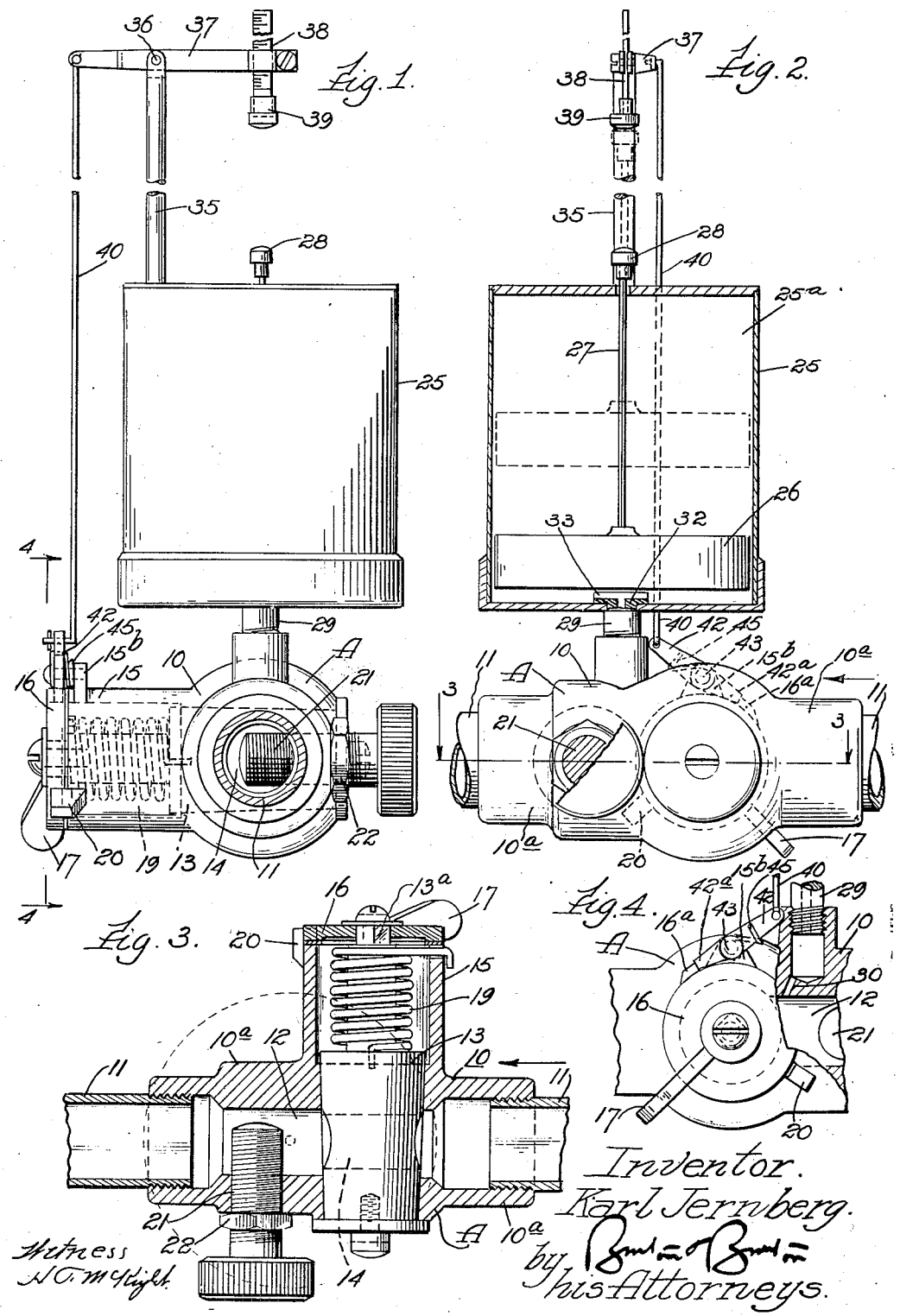

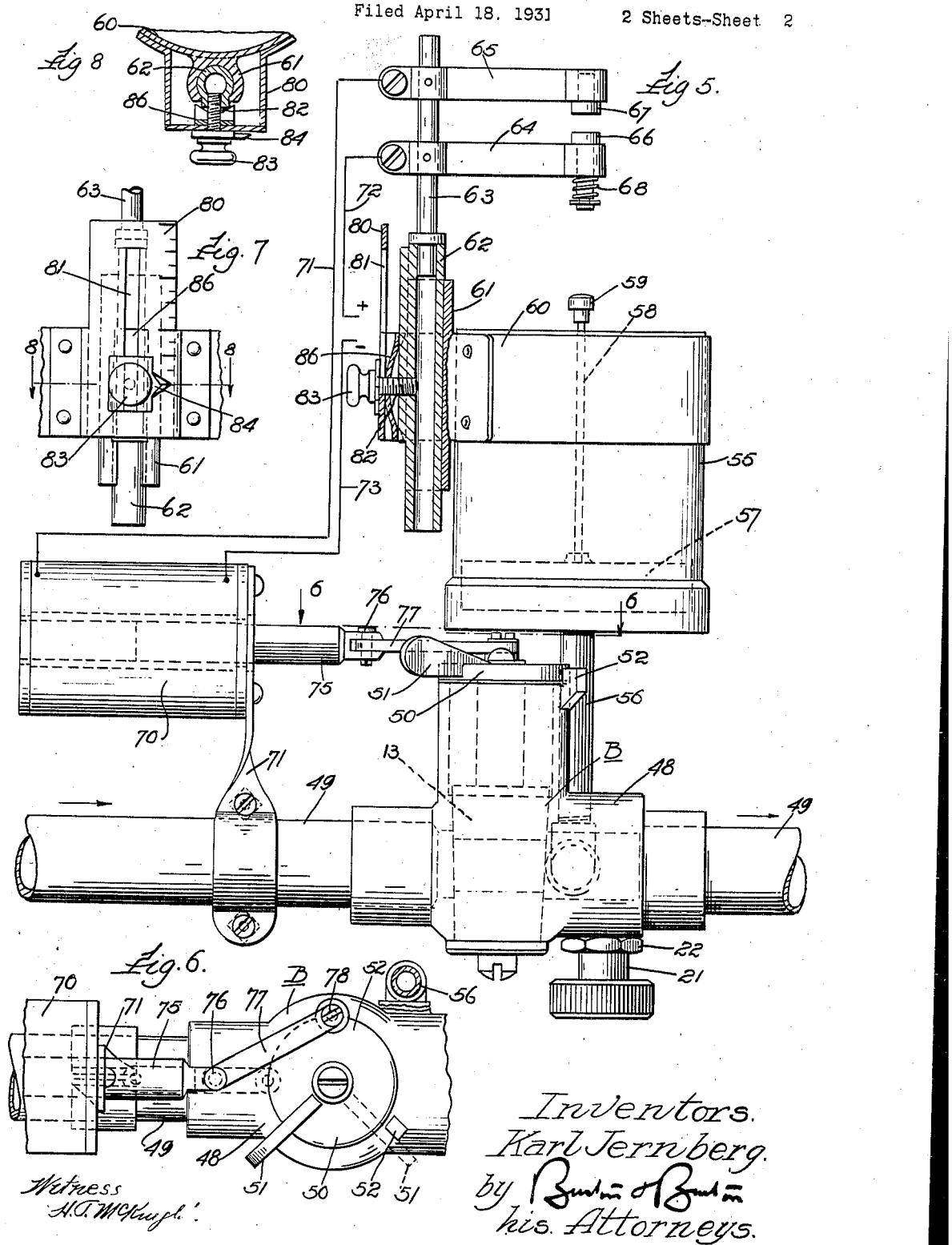

1,848,176

UNITED STATES PATENT OFFICE

KARL JERNBERG, OF CHICAGO, ILLINOIS

AUTOMATIC SHUT-OFF VALVE

Application filed April 18, 1931. Serial No. 531,134.

This invention relates to a control device for a liquid supply system having an intermittently operated valve, and has for its main object to provide an improved device adapted to automatically cause closure of the valve after the passage of a predetermined quantity of liquid therethrough. Another object is to provide a unitary control device of this character which is compact, simple, and positive in operation and which may be located in the supply conduit remotely from the effective discharge outlet thereof. A further object resides in the provision of an improved control device adapted for automatically causing closure of the valve after discharge of a predetermined quantity of liquid therethrough and having adjustable means operable at will for varying the predetermined quantity of liquid to be discharged. It consists in certain features and elements of construction, in combination, as herein shown and described, and as indicated by the claims.

In the drawings:

Figure 1 is a view in elevation of the unitary control device embodying the present invention.

Figure 2 is a view in elevation at substantial right angles to Figure 1 with parts in section to show details of construction.

Figure 3 is a transverse sectional view taken substantially as indicated at line, 3—3, on Figure 2.

Figure 4 is a fragmentary view of the valve device with parts in section, and taken as indicated at line, 4—4, on Figure 1.

Figure 5 is a side elevation of a modified form of the control device adapted to be electrically operated.

Figure 6 is a plan view taken at line, 6—6, on Figure 5.

Figure 7 is a face view of the graduated scale and associated parts on the float casing.

Figure 8 is a transverse section taken substantially at line, 8—8, on Figure 7.

For purposes of illustration it has not been necessary to show any particular application of this invention, but to indicate more clearly the utility of the device it may be explained that it is of particular value, for example, in connection with large coffee urns, such as are used in restaurants. In replenishing these devices it is important that the proper quantity of water be introduced into the urn. If too much is supplied the coffee will be too weak and may have to be discarded; in fact, most restaurants experience considerable loss in the use of these devices. The structure about to be described may therefore be considered as connected into the pipe line through which the water is supplied to a coffee urn or like device; but it will be understood that it may have many other applications.

Referring now in detail to the drawings, the valve device indicated generally at A is interposed in a liquid supply conduit and includes a casing, 10, formed with oppositely extending legs, 10ª, which have threaded connection with the ends of two adjoining pipe portions, 11, which form parts of the conduit. The casing provides a passage, 12, coextensive with said legs and also serving as a part of the supply conduit. Extending transversely through the passage, 12, is a rotary valve element, 13, which is provided with a transverse port, 14, adapted to be registered in alignment with the passage, 12, to form with the respective portions of the conduit, 11, a continuous path for flow of the liquid. When the valve element, 13, is rotated ninety degrees its port opening, 14, is entirely out of registration with the passage, 12, and the conduit is thus closed. The valve casing has an annular extension, 15, surrounding one end of the valve element, and closing the outer end of said extension is a cap member, 16, which is mounted on the squared reduced portion, 13ª, of the rotary valve element, 13, so as to be rotatable therewith. Formed integrally with the cap member, 16, is a laterally projecting handle, 17, by means of which the rotary valve element may be conveniently manipulated; and, as will hereafter appear, this is necessary only in opening the valve. Disposed in the extension, 15, of the valve casing is a coil spring, 19, surrounding the stem of the valve element. This spring has one end anchored in the wall of said extension, 15, and the other end of said rotary valve element (as seen in Figure 3) so that when the valve element is turned in opening direction, it will tension the spring, 17, and when it is released said spring will return the valve to closed position. To be sure that the valve will be arrested in closed position, the casing is formed with a stop shoulder or lug, 20, against which said handle, 17, will abut when the valve is allowed to close.

As seen in Figure 3, the outlet side of the valve casing, 10, is provided with a fixed resistance which, as herein shown, is a set screw, 21, extending into the passageway, 12, of the valve casing; and a nut, 22, is provided for locking said screw, 21, in any desired position of adjustment. This resistance serves to choke the effective outlet passage of the valve and thus create substantial back pressure which, as will hereinafter appear, is employed for controlling the closure of the valve after a predetermined quantity of liquid has been discharged therethrough. The resistance may be interposed in the conduit, 11, at any desirable place between the valve element, and the effective discharge outlet of the conduit, 11, but for convenience, it has been found preferable to embody it as a unitary part of the control device. Therefore, when mention is made in the claims of disposing the resistance in the conduit intermediate the valve and the discharge outlet of said conduit, it is also intended to cover and include the construction herein shown, wherein the resistance is disposed in the portion of the conduit formed by the legs, 10ª, of the valve casing proper.

Associated with the valve device is a float control mechanism which includes a casing, 25, providing a chamber, 25ª, in which is vertically movable a float member, 26, having an up-standing float stem, 27, projecting through the top of the casing, and whose upper end is provided with an abutment head, 28. The float casing, 25, is supported on a fitting, 29, threaded into the valve casing, 10, as seen in Figure 4, and a passageway, 30, is provided to complete the communication between the interior of the float casing and the conduit. This passageway, as may be seen in Figure 4, opens into the valve passage, 12, intermediate the resistance, 21, and the valve port, 14. It will be manifest that when the valve is open the resistance, 21, will create substantial back pressure which will thus cause the liquid to flow upwardly through the passage, 30, into the float chamber, 25ª, and thus gradually raise the float. Desirably the float should not rest on the bottom of the casing, which might delay its movement in response to entry of liquid therein, and therefore the casing is provided with a fitting, 32, which affords communication with the duct of the pipe member, 29, and as may be seen in Figure 2, is formed with a laterally extending slot indicated at 33 so that even if the float, 26, rests on this fixture, 32, the liquid may be discharged laterally through the slots so as to immediately act on the float and cause the same to rise in the casing.

Rigidly mounted on the top of the float casing is a standard, 35, on the upper end of which is pivotally mounted at 36 a transversely extending lever arm, 37, one end of which extends over the casing and has adjustably secured thereto a member, 38, whose lower end is also provided with an abutment head, 39, adapted to be engaged by the head, 28, on the float stem when the float has risen to a predetermined height. The member, 38, is preferably provided with a graduated scale which corresponds to different positions of adjustment of its head, 39, relative to the float casing so as to vary the effective range of movement of the float, which as will presently appear, correspondingly varies the time for operation of the valve; this manifestly varies the predetermined quantity of liquid to be discharged through the valve. Pivotally connected to the opposite end of the lever, 37, is a vertically extending link, 40, whose lower end is pivotally engaged in the end of the detent pawl, 42, which is pivotally mounted at 43, in the lug, 15ᵇ, on the upper side of the valve casing. The opposite end of the detent pawl, indicated at 42ª, is disposed in alignment with and adapted to engage the abutment, 16ª, of the cap, 16, which is so located that when it is in engagement with said pawl the valve element is locked in open position, as seen in Figures 2 and 4. A spring member, 45, is provided on the pawl pivot and normally urges said pawl in the direction for engagement with the periphery of the ratchet. It is to be understood that a valve device of this character is necessarily quite dependent upon having substantially uniform pressure of the liquid in the supply conduit, 11.

The operation of the device is as follows:

The handle, 17, which is normally in valve-closed position abutting against the stop shoulder, 20, is swung to the right to the position indicated in Figure 4, in valve-opening direction, at which time the spring actuated pawl, 42, engages the detent lug, 16ª, and locks the valve in open position against the reaction of the coil spring, 19. Then as the liquid is discharged through the valve port, 14, and passage, 12, the resistance, 21, causes substantial back pressure in the conduit and a certain proportion of the liquid is forced through the passage, 30, into the chamber, 25ª, of the float casing, and thus gradually raises the level of the float, 26; and when a predetermined quantity of liquid has been discharged through the valve, it will be understood that the float, 26, will have been raised to a position where the head, 28, on its stem engages the head, 39, of the member, 38, supported on the end of the lever, 37, and thereby shifts the link, 40, in a downward direction, so as to rock the pawl, 42, about its pivot out of engagement with the abutting lug, 16ª, of the cap, 16. Thus the spring, 19, is permitted to come into play and promptly rotate the valve, 13, to closed position. It is to be understood that the resistance, 21, may be initially adjusted upon installation so that the valve will close only when a predetermined quantity of liquid has been discharged, and it remains fixed at all times thereafter; and this adjustment is such that when the float reaches a certain predetermined level, a certain measured quantity of liquid will have been discharged through the valve.

It will be manifest that when the valve has been closed by the actuation of the linkage above described, the liquid in the float chamber will gradually drain out through the passage, 30, into the passageway, 12, and thus be discharged at the discharge end of the conduit, 11.

The modified construction shown in Figures 5 to 8 inclusive employs a valve device, B, of the same general type as above described, with the exception that it is not necessary to employ a spring for returning the valve element, 13, to closed position, or a detent member for holding said valve element in open position. Said valve device includes a casing, 48, connecting adjacent pipe portions, 49, which form the supply conduit. Rigidly mounted on the reduced end of the valve element, 13, is a disk, 50, which has a laterally extending lug or projection, 51, serving as a handle for turning the valve element in opening direction and normally in closed position of the valve it abuts against the stop lug, 52, on the casing. The handle and its disk, 50, are adapted to be swung to the position indicated in Figure 6 when the valve is opened to initially commence the discharge of a predetermined quantity of liquid. The float mechanism is substantially the same as that previously described and includes a casing 55, which is supported on an upright pipe, 56, connected to the valve casing, 48, and providing a communicating passage between the valve passage, 12, and the interior of the float casing, in which is vertically movable a float, 57, having an up-standing stem, 58, the upper end of which extends through the top of the casing and is provided with an abutment head, 59.

Rigidly secured on the exterior of the float casing, 55, is a band or ring, 60, which is provided with a vertically extending guide sleeve, 61, for an adjustable supporting member, 62, firmly secured to the upper end of which is an up-standing supporting member of insulating material, indicated at 63, on which is mounted in vertically spaced-apart relation, a pair of cross arms, 64, and 65, respectively, extending over the float casing. Said arms carry at their outer ends and in substantial alignment with the head, 59, cooperating electrical contact members, 66 and 67, respectively. The contact point, 67, is rigidly mounted on its cross arm, 65, while the contact member, 66, is vertically movable in its support so that when the lower end thereof is engaged by the head, 59, on the float stem it will engage the contact, 67; said movable contact is normally urged in a direction away from the fixed contact, 67, by a coil spring, 68. This spring, 68, although providing slight additional resistance to the rise of the float when its head, 59, engages the lower end of said contact, 66, has the special purpose of insuring separation of the contacts, 66 and 67, when the float recedes in its chamber, until the head, 59, is out of engagement with the lower end of the contact, 66. These contact points through their respective arms, 64 and 65, are connected in an electric circuit which includes a solenoid, 70, supported by a bracket, 71, on the conduit, 49, and said electrical circuit includes a conductor, 71, connecting the cross arm, 65, with one of the contacts of the solenoid, also a conductor, 72, connecting the other arm, 64, with one of the terminals of a source of electrical supply, and a conductor, 73, which connects the other terminal of the source of electrical supply to the other terminal of the solenoid, thus completing the electrical circuit.

The solenoid is provided with a reciprocating armature, 75, whose outer end is pivotally connected at 76, to a link, 77, which in turn is pivotally connected at 78 to the disk element, 50, which is rigidly associated with the handle member, 51, on the rotary valve, 13. It will now be apparent that when the electric circuit is closed by reason of the float rising in its casing until the head, 59, brings the contacts, 66 and 67, into engagement, the solenoid will become energized and retract its armature, 75, and through the connection of the link, 77, rotate the rotary valve element, 13, to closed position. After the valve has been closed the pressure on the outlet side of the valve is gradually reduced by reason of the discharge of the liquid through the end of the conduit, and the liquid in the float chamber is then permitted to drain back through the passageway, 30, into the valve passageway, 12, and thus gradually be discharged from the conduit. And as the float recedes so as to be out of engagement with the lower end of the contact member, 66, the spring, 68, will insure separation of these contact points for breaking the electrical circuit, and permit the armature, 75, of the solenoid to be freely movable so as to permit the rotary valve to be rotated in opening direction by the handle, 51.

It is desirable to provide for varying the predetermined amount of liquid to be discharged through the valve, and for this purpose a graduated scale indicated at 80 is rigidly secured to the band, 60, about said float chamber, and is provided with an upwardly extending elongated slot, 81, through which extends the threaded shank, 82, of the knob, 83. Said knob is connected to the movable support, 62, and by this means said support and its auxiliary extension, 63, carrying the electrical contact arms, 64, 65, may be vertically shifted so as to vary the range of movement of the float, 57, and thus correspondingly vary the predetermined amount of liquid that is to be discharged through the valve before it is closed by this mechanism; and rigidly associated with the knob, 83, is an indicator, 84, adapted to be aligned with the graduations of the scale, 80, A substantially flat spring member, 86, is interposed between the scale member, 80, and the movable support element, 62, for yieldingly maintaining said support and its electrical contact arms in any desired position of adjustment.

The present invention is adapted to a relatively wide range of uses, wherein it is desirable to automatically control the discharge of liquid through a valve so as to permit discharge of only predetermined quantities. Such valve devices are especially suitable and are highly desirable for use in connection with coffee urns in restaurants, laundry apparatus, power plant equipment, etc., where it is important to supply a reasonably exact predetermined quantity of liquid exeditiously.

Although I have shown and described certain embodiments of the present invention, it is manifest that it is capable of further modification and rearrangement of parts without departing from the spirit and scope thereof. I do not therefore wish to be understood as limiting myself to the particular forms herein shown and described, except as indicated in the appended claims.

I claim:—

1. In a control device, the combination with a liquid supply conduit, of a normally closed valve connected in the conduit, resistance means interposed in the conduit intermediate the valve and the discharge end of the conduit for choking the flow of liquid therethrough and creating a back pressure in said conduit, and means having a connection by a passage communicating with a portion of the conduit subject to said back pressure and responsive thereto for causing closure of the valve when a predetermined quantity of liquid has been discharged therethrough.

2. In a control device, the combination with a conduit adapted to normally supply liquid at substantially uniform pressure, of a normally closed valve connected in the conduit and adapted to be manually opened, resistance means interposed in the conduit intermediate the valve and the discharge end of the conduit for creating a back pressure therein, and means associated with the valve and responsive to said back pressure in the conduit for causing closure of said valve when a predetermined quantity of liquid has been discharged therethrough.

3. In a control device, the combination with a liquid supply conduit, of a normally closed valve connected in the conduit and adapted to be manually opened, resistance means interposed in the conduit intermediate the valve and the discharge end of said conduit for creating a back pressure therein, a float device having an inlet passage communicating with a portion of the conduit subject to said back pressure and responsive thereto, and means connecting said float device and valve adapted to automatically close said valve when the float reaches a predetermined height and a predetermined quantity of liquid has been discharged through said valve.

4. In the construction defined in claim 3, said resistance means being adjustable for varying the back pressure.

5. In a control device, the combination with a conduit adapted to normally supply liquid at substantially uniform pressure, of a normally closed valve connected in the conduit and adapted to be manually operated, resistance means interposed in the conduit intermediate the valve and the discharge end of said conduit for creating a back pressure therein, a float device associated with said valve and having an inlet passage communicating with a portion of the conduit subject to said back pressure, and means actuated by the float when it reaches a predetermined height for automatically closing the valve, which action takes place when a predetermined quantity of liquid has been discharged through said valve, said means being adjustable for varying the range of movement of the float device and thereby varying the predetermined quantity of liquid to be discharged through the valve.

6. In the construction defined in claim 5, a graduated scale associated with said last mentioned means for indicating measured quantities of liquid to be discharged through the valve, which correspond to certain relative positions of adjustment of said means.

7. In a control device, the combination with a conduit adapted to normally supply liquid at substantially uniform pressure, of a normally closed valve device connected in the conduit, said valve device having resistance means therein disposed at the outlet side of the valve for creating a back pressure in the conduit, and means associated with said valve device and having connection by a passage communicating with the conduit intermediate said resistance and the valve port, and responsive to said back pressure for automatically causing closure of the valve when a predetermined quantity of liquid has been discharged therethrough.

8. In a control device, the combination with a conduit adapted to normally supply liquid at substantially uniform pressure, of a normally closed valve device connected in the conduit and adapted to be manually opened, said valve device being provided with resistance means disposed in the outlet side thereof for choking the flow of liquid through the conduit and creating a back pressure therein, float mechanism associated with said valve device and having an inlet passage communicating with the conduit at the outlet side of the valve intermediate said resistance and said valve and responsive to said back pressure in the conduit, and means actuated by the float mechanism for automatically closing the valve when a predetermined quantity of liquid has been discharged through said valve.

9. The construction defined in claim 8, said float mechanism including a casing providing a float chamber and a float element disposed therein, the bottom of said casing being provided with an upstanding projection for supporting said float in spaced relation to the bottom to insure prompt actuation thereof in response to liquid entering the casing.

10. In a control device, the combination with a conduit adapted to normally supply liquid at substantially uniform pressure, of a normally closed valve device connected in the conduit and adapted to be manually opened, resistance means interposed in the conduit intermediate the valve and the discharge end of the conduit for choking the effective flow of liquid therethrough and creating a back pressure in said conduit, said valve device including a casing having a valve seat, a valve element co-operating with the seat, spring means normally urging said valve to closed position, means for latching the valve in open position in opposition to said spring means, and means having a connection by a passage communicating with a portion of the conduit subject to said back-pressure and responsive thereto, for releasing said latch means when a predetermined quantity of liquid has been discharged through the valve, and permitting said valve member to be moved to closed position under the action of said spring means.

11. In a control device, the combination with a conduit adapted to normally supply liquid at substantially uniform pressure, of a normally closed valve device connected in the conduit and adapted to be manually opened, resistance means interposed in the conduit intermediate the valve and the discharge end of the conduit for choking the effective flow of liquid therethrough and creating a back pressure in said conduit, said valve device including a casing having a seat and a valve element, and spring means normally urging said valve element to closed position, means for latching the valve in open position in opposition to said spring means, and float mechanism having a passage connecting with a portion of the conduit subject to said back pressure and responsive thereto, and including connecting means for releasing said latch means when a predetermined quantity of liquid has been discharged through the valve, and thus permit said valve element to be moved to closed position under control of said spring means.

12. In a control device, the combination with a conduit adapted to normally supply liquid at substantially uniform pressure, of a normally closed valve device interposed in the conduit, said valve device including a casing having a valve seat, and a valve element co-operating therewith and adapted to be manually moved to open position, resistance means interposed in the conduit intermediate the valve element and the discharge end of the conduit and adapted for choking the flow of liquid therethrough for creating a back pressure in the conduit, spring means normally urging said valve element in closing direction, a cap member positively connected to said valve element on the exterior of said valve casing, a detent pawl pivotally mounted on said casing and co-operating with an abutment on said cap member, and adapted to hold said valve in opening position against the reaction of said spring means when said valve element has been manually moved to such position, and float-operated mechanism for controlling the closure of said valve element, including a casing providing a chamber having a passage communicating with a portion of the conduit subject to said back-pressure, a float in said chamber having an upstanding stem associated therewith, and linkage adapted to be engaged by said stem when said float has reached a predetermined height, which corresponds to the discharge of a predetermined quantity of liquid through the valve, for shifting said pawl out of engagement with its co-operating abutment on the cap member, and thereby permitting said valve element to be moved to closed position by the action of said spring means.

13. In the construction defined in claim 12, a handle member rigidly associated with said cap member for manually moving said valve element to open position, and a stop shoulder on the valve casing adapted to be engaged by said handle for limiting movement of said valve element in valve-closing direction.

14. In the construction defined in claim 12, said linkage including a lever pivotally mounted on the float casing, a link connecting one end of said lever to the detent pawl and a contact member carried at the other end of said lever and adapted to be engaged by the upper end of the float stem for actuating the linkage, said contact member being of substantial length and adjustably mounted on said lever and having a graduated scale associated therewith to permit adjustment thereof at positions corresponding to the discharge of predetermined quantities of liquid through the valve.

15. In a control device, the combination with a conduit adapted to normally supply liquid at substantially uniform pressure, of a normally closed valve device connected in the conduit and including a casing having a valve seat, a rotary valve element co-operating with the seat, resistance means disposed in the outlet side of said valve casing and adapted to choke the effective flow of liquid therethrough, thus creating a back pressure in the conduit, and float control mehanism having a connection by a passage communicating interiorly with the valve passage intermediate the valve element and said resistance means and responsive to said back pressure for causing rotation of the valve element to closed position when a predetermined quantity of liquid has been discharged therethrough.

16. A control device, in combination with a conduit adapted to normally supply liquid at substantially uniform pressure, a valve device connected in the conduit and including a casing having a valve seat, a rotary valve element co-operating with the seat, an exteriorly accessible operating handle connected to the valve element, resistance means interposed in the conduit intermediate the valve element and the effective discharge end of the conduit for creating a back pressure therein, float control mechanism including a casing providing a float chamber having a passage communicating with the conduit intermediate the valve element and said resistance means, a float in the chamber, an upstanding stem on the float and a solenoid having its armature operably connected to said rotatable valve element; and electrical contact means carried by said float mechanism and connected in the electrical circuit including said solenoid, and adapted to be engaged by the stem of said float when it reaches a predetermined height for closing the electrical circuit and energizing the solenoid for closing said valve when a predetermined quantity of liquid has been discharged therethrough.

17. In the construction defined in claim 16, said electrical contact means on the float mechanism including a support of insulating material, a pair of normally separated electric contacts, one being movable toward the other, the latter adapted to be engaged by the stem of said float for moving it into engagement with the former for completing the electric circuit.

18. In the construction defined in claim 16, said electrical contact means on the float mechanism including a support of insulating material, a pair of normally separated electric contacts, one being movable toward the other, the latter adapted to be engaged by the stem of said float for moving into engagement with the former for completing the electric circuit, and spring means normally urging said movable contact member in the direction away from the other contact element.

19. In a control device, the combination with a conduit adapted to normally supply liquid at substantially uniform pressure, of a normally closed valve device connected in the conduit and including a casing having a valve seat, and a valve element co-operating therewith, an operating handle rigidly associated with said valve element, for manually moving it in opening direction, resistance means interposed in the conduit intermediate the valve port and the discharge end of the conduit for choking the flow of liquid therethrough and creating a back pressure in said conduit, and control mechanism including a float device comprising a casing forming a chamber provided with a passage communicating with the conduit intermediate the valve element and the resistance means, a float disposed in said casing having an upstanding stem rigidly associated therewith, an electrically operated mechanism actuated by said float and comprising a solenoid having its armature operably connected to said rotary valve element, a supporting element of insulating material carried on said casing, a pair of normally separated electrical contacts carried by said insulating element and connected in an electrical circuit including said solenoid, one of said contacts being movable toward the other and adapted to be engaged by the stem of said float when the latter reaches a predetermined height for moving it into engagement with the fixed contact, completing the electrical circuit, energizing the solenoid for closing said rotary valve after a predetermined quantity of liquid has been discharged therethrough, said support of insulating material carrying the spaced contacts being adjustable with respect to the float mechanism, whereby said float may close the electrical circuit when said float arrives at heights corresponding to the discharge of different predetermined quantities of liquid through the valve device.

20. In the construction defined in claim 19, spring means for yieldingly maintaining the support of insulating material and said spaced contacts at any desired position of adjustment.

21. In the construction defined in claim 19, a fixed graduated scale associated with the float casing, and an indicator movable with said support of insulating material for registration with said scale for indicating positions of adjustment corresponding to certain predetermined quantities of liquid to be discharged through the valve.

KARL JERNBERG.